(12) United States Patent
Kasahara et al.

(10) Patent No.: US 6,927,926 B2
(45) Date of Patent: Aug. 9, 2005

(54) TELEPHOTO LENS AND TELEPHOTO LENS APPARATUS HAVING THE SAME

(75) Inventors: Takashi Kasahara, Tachikawa (JP); Masahiro Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 128 days.

(21) Appl. No.: 10/413,218

(22) Filed: Apr. 15, 2003

(65) Prior Publication Data

US 2004/0017605 A1 Jan. 29, 2004

(30) Foreign Application Priority Data

Apr. 22, 2002 (JP) ........................................ 2002-118967
Apr. 1, 2003 (JP) ........................................ 2003-098143

(51) Int. Cl.$^7$ ............................................. G02B 15/14
(52) U.S. Cl. ........................ 359/747; 359/684; 359/686; 359/679; 359/773
(58) Field of Search ................................. 359/745, 747, 359/686, 679, 684, 771–773

(56) References Cited

U.S. PATENT DOCUMENTS 4,348,084 A    9/1982   Kitagishi et al. ........... 350/454
6,359,739 B1 *  3/2002   Sensui ........................ 359/754

FOREIGN PATENT DOCUMENTS

| JP | 61-215513 | 9/1986 |
| JP | 01-237611 | 9/1989 |
| JP | 03-278012 | 12/1991 |
| JP | 2000-089103 | 3/2000 |

* cited by examiner

Primary Examiner—Evelyn A. Lester
(74) Attorney, Agent, or Firm—Kenyon & Kenyon

(57) ABSTRACT

A telephoto lens includes, in order from the object side, a first lens unit having a positive refracting power, a second lens unit having a negative refracting power, a third lens unit having a positive refracting power, and a fourth lens unit having a negative refracting power. The second lens unit has a cemented lens composed of a positive lens and a negative lens, and a negative lens. The fourth lens unit has a cemented lens composed of a negative lens and a positive lens, and a negative lens. The telephoto lens satisfies the following conditions:

$$\nu_d > 80$$

$$-0.5 > f_4/f > -1.2$$

where $\nu_d$ is an Abbe's number of a lens having a positive refracting power in the first lens unit, $f_4$ is a focal length of the fourth lens unit, and f is a focal length of the entire optical system.

21 Claims, 10 Drawing Sheets

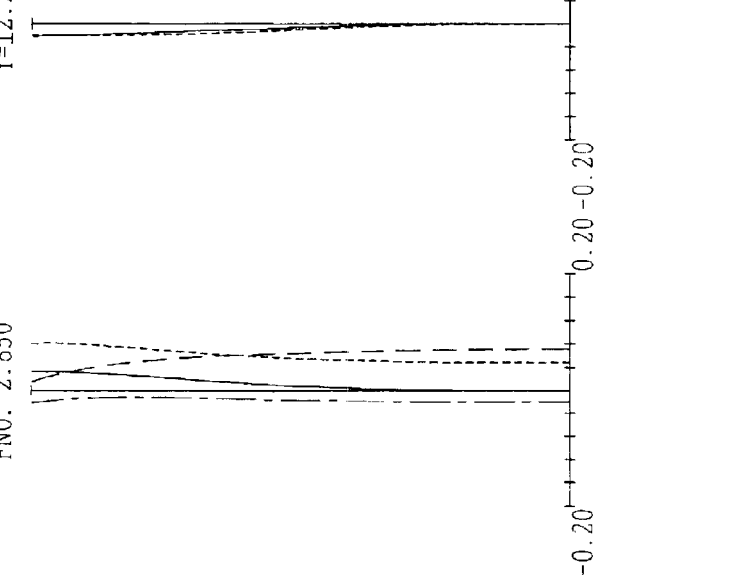

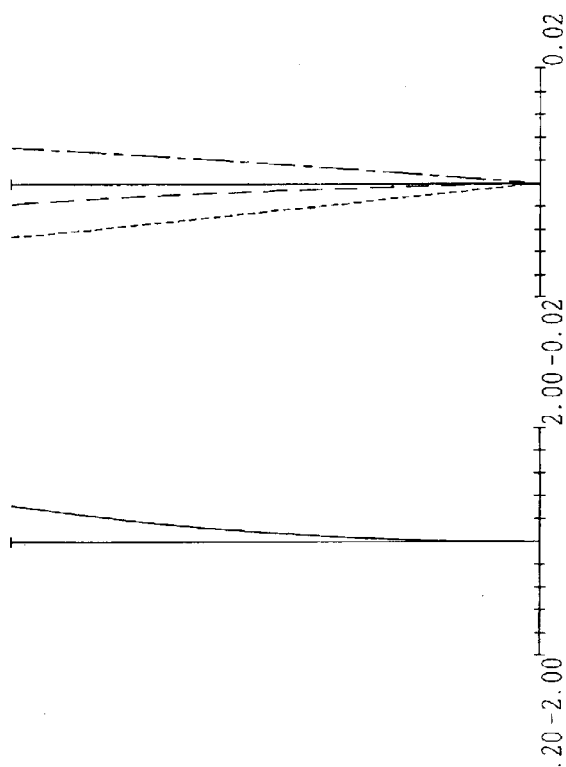

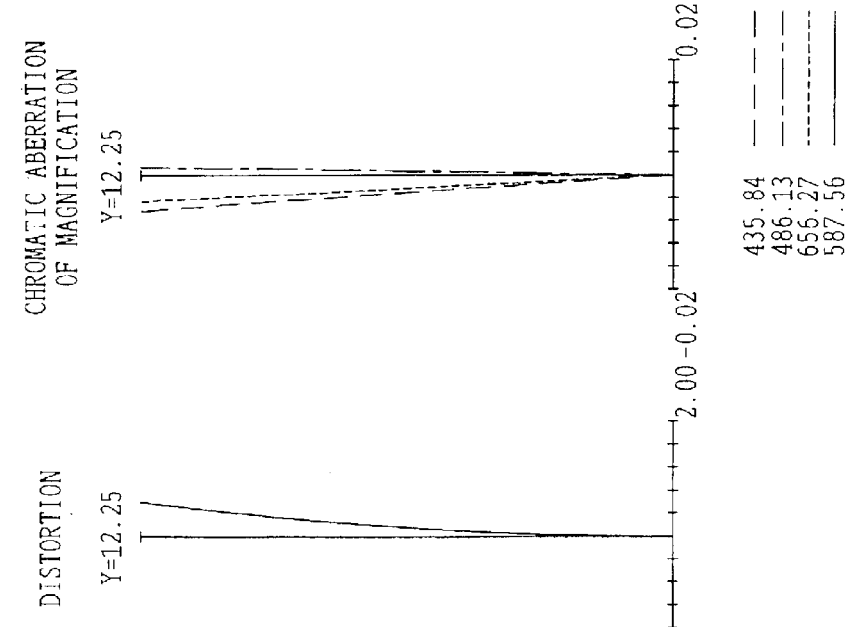

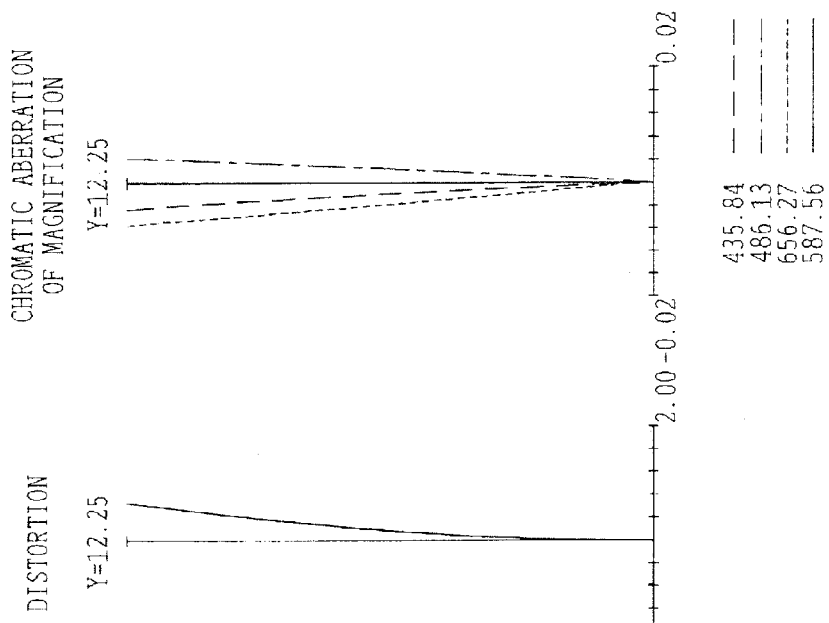

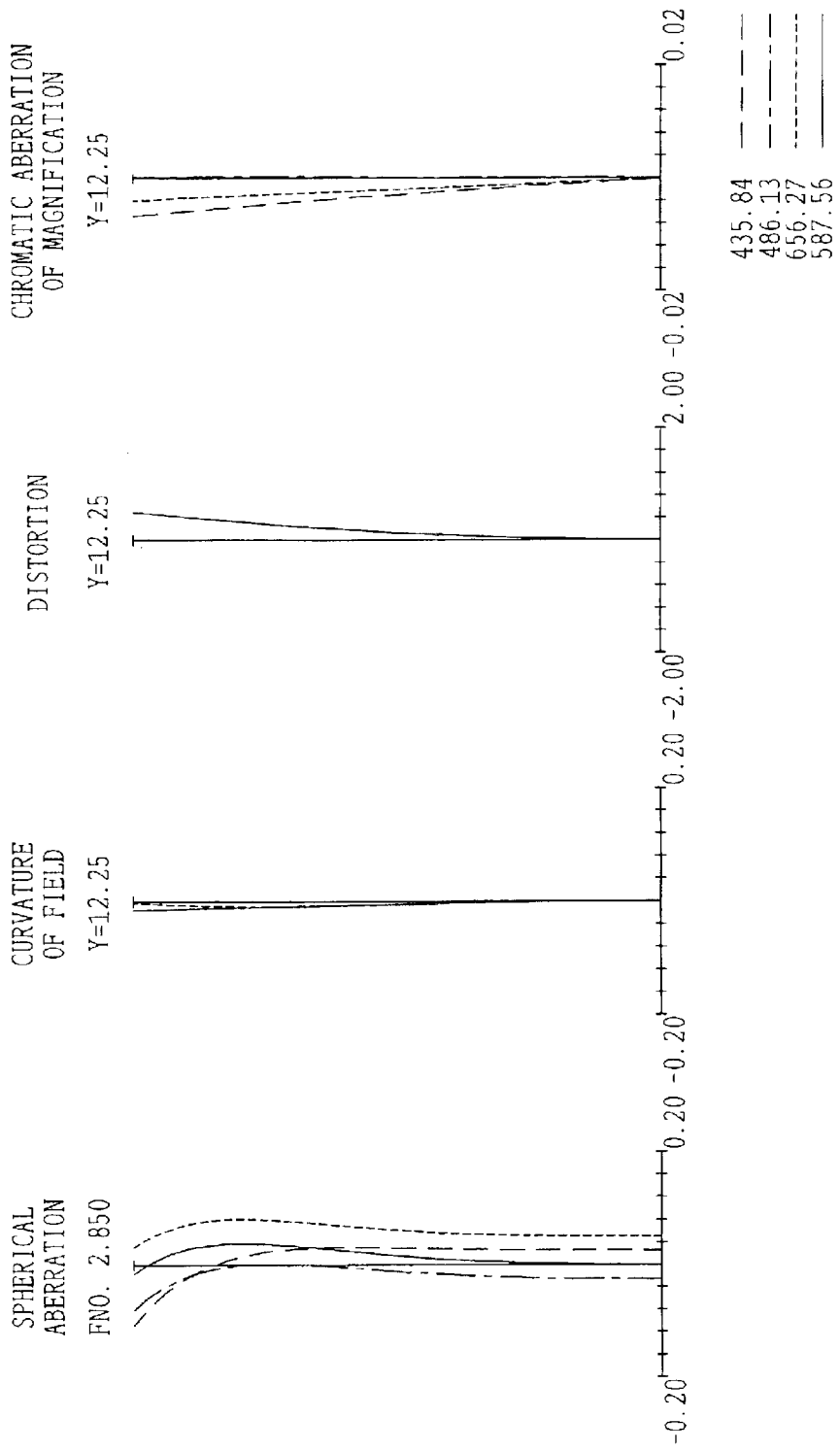

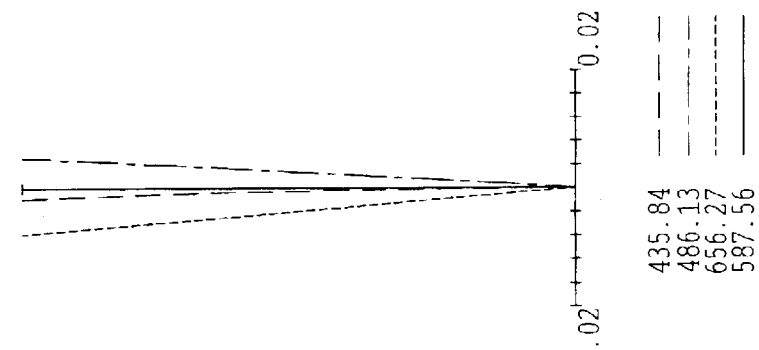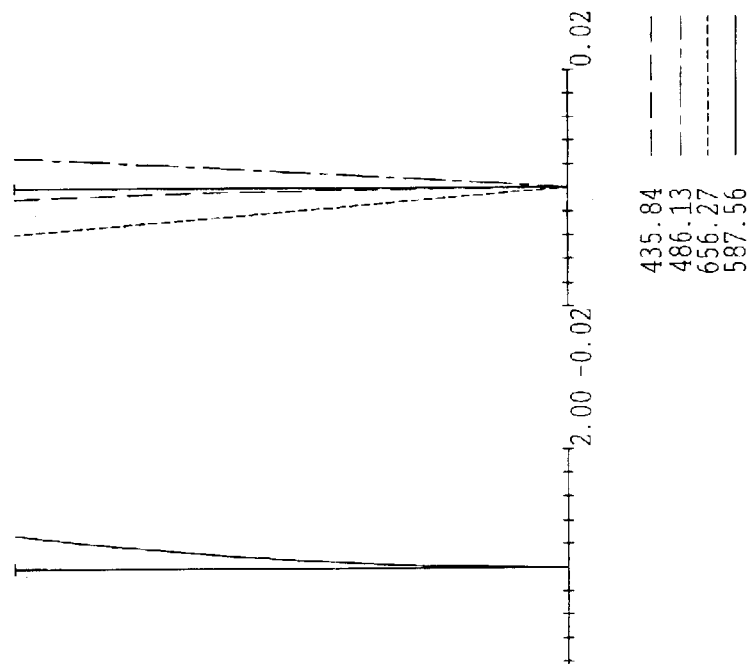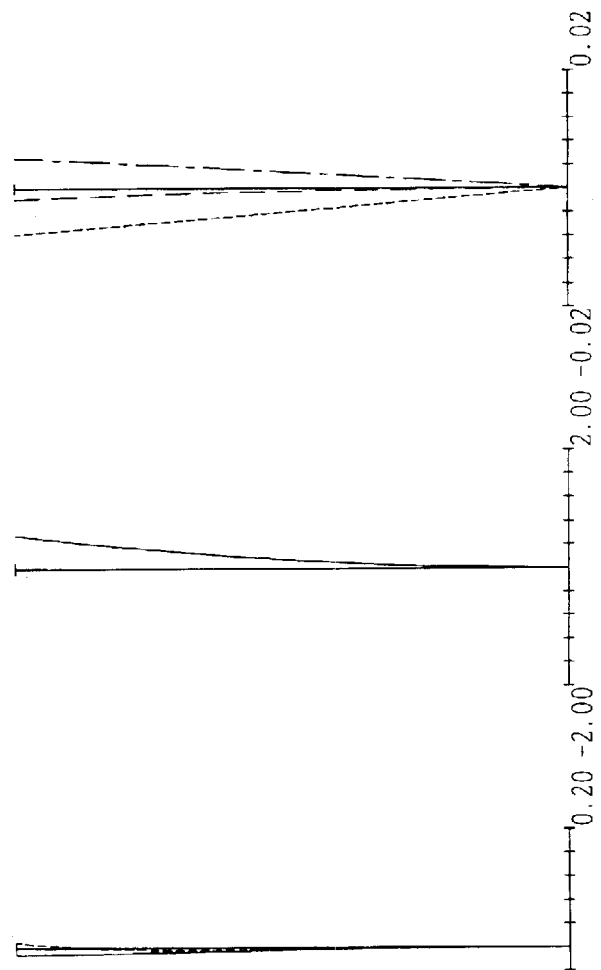

TELEPHOTO LENS AND TELEPHOTO LENS APPARATUS HAVING THE SAME

BACKGROUND OF THE INVENTION

1) Field of the Invention

The present invention relates to an inner-focus type telephoto lens that is most suitable for a digital camera and to a telephoto lens apparatus that is most suitable for a lens-exchange type digital camera.

2) Description of Related Art

Conventionally, a number of inner-focus type telephoto lenses have been proposed as exchangeable lenses used for single-lens reflex cameras for silver halide photography. This type of telephoto lens, which performs focusing from the infinity to the proximity by moving inner lenses alone while keeping the total length of the optical system constant, has been proposed by Japanese Patent Application Preliminary Publication (KOKAI) No. Sho 55-147606, Japanese Patent Application Preliminary Publication (KOKAI) No. 2000-89103, Japanese Patent Application Preliminary Publication (KOKAI) No. Sho61-215513, etc. in various configurations.

A telephoto lens as described in JP KOKAI No. Sho 55-147606 or JP KOKAI No.2000-89103 includes, in order from the object side, a first lens unit having a positive refracting power, a second lens unit having a negative refracting power, and a third lens unit having a positive refracting power. This telephoto lens is configured to perform focusing by moving the second lens unit or the third lens unit. In addition, the first lens unit having a positive refracting power is composed of two positive lenses and one negative lens.

Also, a telephoto lens as described in JP KOKAI No. Sho 61-215513 includes, in order from the object side, a first lens unit having a positive refracting power, a second lens unit having a negative refracting power, a third lens unit having a positive refracting power, and a fourth lens unit having a negative refracting power. This telephoto lens is configured to perform focusing via the second lens unit having a negative refracting power and the fourth lens unit having a negative refracting power, and is improved to keep good performance in a closer proximity.

On the other hand, in accordance with recent development of digital cameras, lens-exchangeable digital cameras have been commercialized. Such a digital camera often employs, as its exchange lens, an optical system for silver halide photography as it is.

However, digital cameras having image pickup elements with much greater number of pixels have come on the scene in accordance with engineering improvement of image pickup elements. In order to match such a high-definition image pickup element, optical systems also are required to have much higher resolution. Therefore, if an optical system that has been used for a conventional single-lens reflex camera for silver halide photography is used as a telephoto lens for a digital camera having such a high-definition image pickup element, a sufficiently high resolving power cannot be attained.

In addition, with the arrival of new users of digital cameras, requirement for performance has been much increased. To be specific, reduction of distortion, reduction of chromatic aberration, and, further, keeping of good performance in a closer proximity are required.

In this regard also, it is unsatisfactory to use an optical system that have been used for a conventional single-lens reflex camera as a telephoto lens.

SUMMARY OF THE INVENTION

The present invention provides a telephoto lens that includes, in order from the object side, a first lens unit having a positive refracting power, a second lens unit having a negative refracting power, a third lens unit having a positive refracting power, and a fourth lens unit having a negative refracting power, wherein the second lens unit includes a cemented lens composed of a positive lens and a negative lens, and a negative lens, the fourth lens unit includes a cemented lens composed of a negative lens and a positive lens, and a negative lens, and the telephoto lens satisfies the following conditions (1) and (2):

$$v_d > 80 \quad (1)$$

$$-0.5 > f_4/f > -1.2 \quad (2)$$

where $v_d$ is an Abbe's number of a lens having a positive refracting power in the first lens unit, $f_4$ is a focal length of the fourth lens unit, and f is a focal length of the entire optical system.

In addition, the present invention provides a telephoto lens that satisfies the following condition (3):

$$n_{d1} - n_{d2} > 0.2 \quad (3)$$

where $n_{d1}$ is a refractive index of the positive lens and $n_{d2}$ is a refractive index of the negative lens, in the cemented lens in the fourth lens unit.

Also, the present invention provides a telephoto lens that includes, in order from the object side, a first lens unit having a positive refracting power, a second lens unit having a negative refracting power, a third lens unit having a positive refracting power, and a fourth lens unit having a negative refracting power, wherein the first lens unit consists of at least two positive lenses and two negative lenses.

These and other features and advantages of the present invention will become apparent from the following detailed description of the preferred embodiments when taken in conjunction with the accompanying drawings.

BRIEF DESCRIPTION OF THE DRAWINGS

FIG. 2 are diagrams that show spherical aberration, curvature of field, distortion, and chromatic aberration of magnification under the infinity-focused condition in the first embodiment.

FIG. 3 are diagrams that show spherical aberration, curvature of field, distortion, and chromatic aberration of magnification under the proximity-focused condition in the first embodiment.

FIG. 5 are diagrams that show spherical aberration, curvature of field, distortion, and chromatic aberration of magnification under the infinity-focused condition in the second embodiment.

FIG. 6 are diagrams that show spherical aberration, curvature of field, distortion, and chromatic aberration of magnification under the proximity-focused condition in the second embodiment.

FIG. 8 are diagrams that show spherical aberration, curvature of field, distortion, and chromatic aberration of magnification under the infinity-focused condition in the third embodiment.

FIG. 9 are diagrams that show spherical aberration, curvature of field, distortion, and chromatic aberration of magnification under the proximity-focused condition in the third embodiment.

DETAILED DESCRIPTION OF THE PREFERRED EMBODIMENTS

Figure 1:
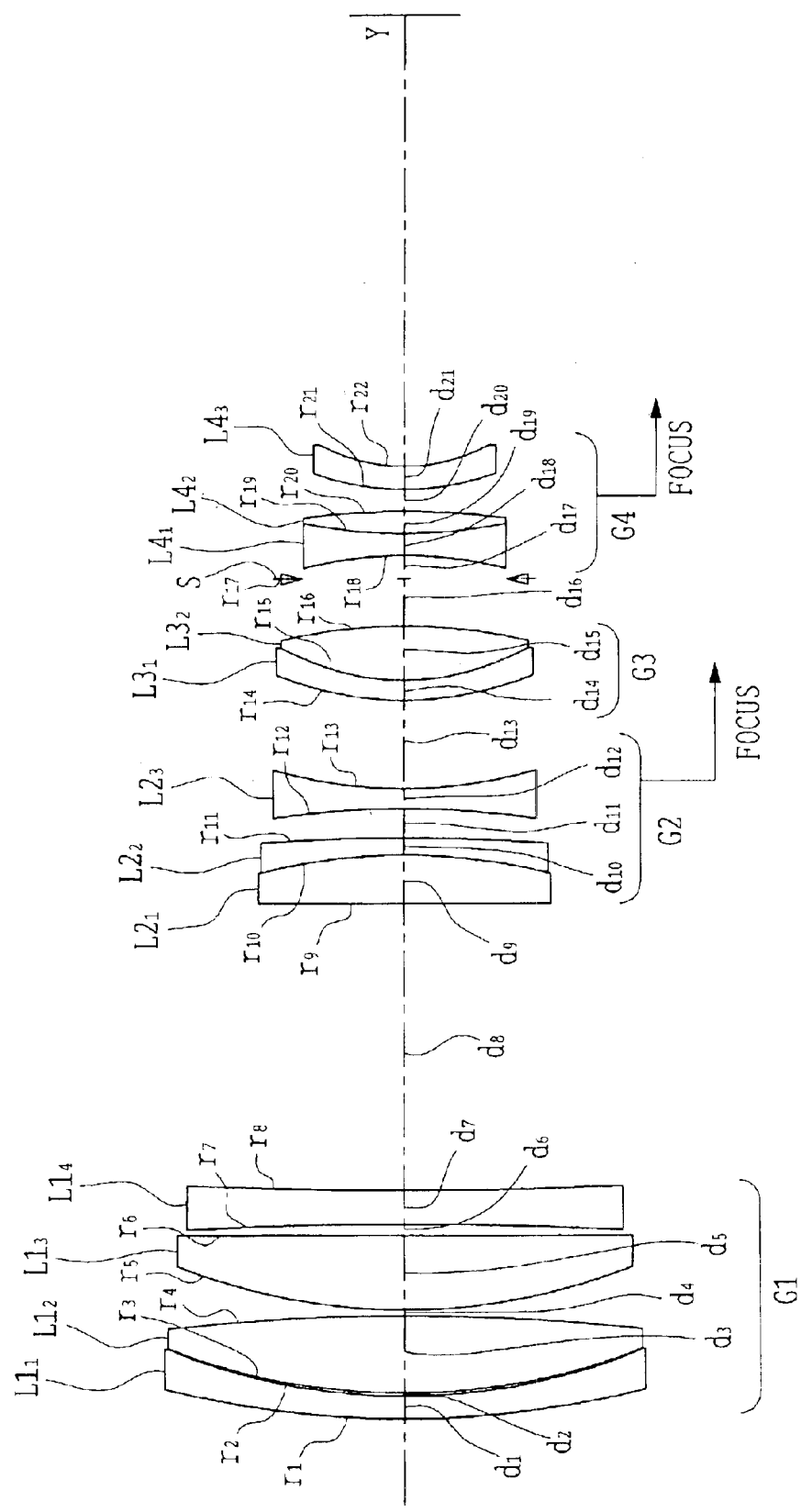
FIG. 1 is a sectional view that shows a lens configuration of the telephoto lens according to the first embodiment of the present invention, taken along the optical axis.

Preceding the description of the embodiments, the functions of the present invention are explained.

Condition (1) of the present invention regulates an Abbe's number of a lens having a positive refracting power in the first lens unit of the telephoto lens according to the present invention.

Since aberrations generated in the first lens unit with a positive refracting power are magnified to affect aberration performance on the image plane, it is necessary to sufficiently compensate for aberrations (especially for chromatic aberration) inside the first lens unit. Therefore, it is preferred that a lens having a positive refracting power in the first lens unit satisfies Condition (1) as according to the present invention. Whereby, generation of chromatic aberration can be suppressed.

In addition, it is much preferred that the first lens unit has a plurality of lenses each having a positive refracting power, of which a plurality of lenses satisfy Condition (1). Whereby, since a plurality of lenses each having a positive refracting power are arranged, various aberrations can be more easily compensated for while chromatic aberration, which is easily generated in the first lens unit, is compensated for.

Condition (2) of the present invention regulates a ratio of the focal length of the fourth lens unit, which has a negative refracting power, to the focal length of the entire optical system.

In a configuration where the second lens unit includes a cemented lens composed of a positive lens and a negative lens, and a negative lens, chromatic aberration of magnification can be favorably compensated for, in particular. In addition, generation of various aberrations in the second lens unit can be suppressed.

In addition, in a configuration where the fourth lens unit of the present first invention has a cemented lens composed of a negative lens and a positive lens, and a negative lens and satisfies Condition (2), off-axial aberrations, in particular, curvature of field, generated in the first lens unit, the second lens unit, and the third lens unit that are configured as described above can be compensated for.

If the lower limit value of Condition (2) is not reached, the negative refracting power of the fourth lens unit becomes weak, to make it difficult to compensate for curvature of field. On the other hand, if the upper limit value of Condition (2) is exceeded, the negative refracting power of the fourth lens unit becomes strong and accordingly the optical system becomes susceptible to decentration, to cause difficulty of manufacturing.

In addition, according to the present invention, it is much preferred that the following condition (3) is satisfied:

$$n_{d1} - n_{d2} > 0.2 \quad (3)$$

where $n_{d1}$ is a refractive index of the positive lens and $n_{d2}$ is a refractive index of the negative lens, in the cemented lens in the fourth lens unit.

Condition (3) regulates a difference of refractive index in the cemented lens.

If the lower limit value of Condition (3) is not reached, it is difficult to compensate for curvature of field that is generated through the first lens unit to the third lens unit.

If the second lens unit and the fourth lens unit are configured as described above, compensation for aberrations such as chromatic aberration and distortion can be favorably achieved.

Also, it is preferred that a telephoto lens includes, as according to the present invention, in order from the object side, a first lens unit having a positive refracting power, a second lens unit having a negative refracting power, a third lens unit having a positive refracting power, and a fourth lens unit having a negative refracting power, wherein the first lens unit consists of at least two positive lenses and two negative lenses. In this configuration, axial chromatic aberration can be favorably compensated for in comparison with the configuration of the first lens unit including two positive lenses and one negative lens as in the telephoto lens set forth by JP KOKAI No. Sho 55-147606 or JP KOKAI No. 2000-89103.

In addition, it is much preferred that the first lens unit having a positive refracting power consists of, in order from the object side, a negative lens, two positive lenses and a negative lens.

The first lens unit having a positive refracting power is required to be configured in such a manner as to converge a beam of rays while generating as small aberrations as possible. Therefore, generation of not only axial chromatic aberration but also off-axial aberrations can be made small in a configuration where, as in the present invention, the first lens unit having a positive refracting power consists of, in order from the object side, a negative lens, two positive lenses and a negative lens.

Also, according to the present invention, a telephoto lens configured as stated above can prevent degradation of performance in focusing using the second lens unit. Specifically, where the second lens unit is configured to move toward the image side while at least the first lens unit being fixed, an inner-focus type system is formed, to prevent dust from being entrapped during focusing.

In a case where focusing is performed using the second lens unit and the fourth lens unit, curvature of field can be compensated for in good condition from the infinity to the proximity. In this case, if the first lens unit and the third lens unit are to be fixed, the total length of the optical system is kept constant during focusing and the focusing can be performed with little fluctuation of aberrations while the number of moving lens units being limited to two.

Regarding the moving manner of the lens units in focusing toward the proximity, if the second lens unit and the fourth lens unit are to be moved toward the image side, an amount of movement of the lens units can be made small.

In a case where focusing is performed using the second lens unit and the third lens unit, curvature of field can be compensated for in good condition from the infinity to the proximity. In addition, since focusing using the second lens unit and the third lens unit allows these lens units to be arranged for control by a single focus cam, it is possible to keep small the size of a lens frame member in the diameter direction upon simplifying the structure. If a telephoto lens has a large aperture, the lens itself having a large diameter and a lens frame member, which is constructed considering the strength, render the entire telephoto lens apparatus heavy. Thus, a small diameter of the telephoto lens contributes to reduction in weight of the telephoto lens apparatus.

In this case, if the first lens unit and the fourth lens unit are to be fixed, the total length of the optical system is kept constant during focusing and the focusing can be performed with little fluctuation of aberrations while the number of moving lens units being limited to two.

Regarding the moving manner of the lens units in focusing toward the proximity, if the configuration is made so that the second lens unit is moved toward the image side while the third lens unit is moved toward the object side, an amount of movement of the lens units can be made small.

Also, according to the present invention, it is preferred that the telephoto lens satisfies the following condition (4):

$$10.0 \text{ mm} < Y < 13.0 \text{ mm} \tag{4}$$

where Y is a diagonal length of the picture surface.

If the lower limit value of Condition (4) is not reached, an image pickup element having extremely minute pixels has to be mated for attaining an image with a large number of pixels, and thus it is difficult to assure a certain resolving power.

On the other hand, if the upper limit value of Condition (4) is exceeded, the focal length of the optical system is required to be long for maintaining the same field angle. As a result, the size of the optical system becomes large, to lose its portability and mobility for a user.

Furthermore, in a case where the first lens unit has a plurality of lenses each having a positive refracting power, it is much preferred that each of the lenses having a positive refracting power satisfies the following condition (5):

$$85 > v_d > 80 \tag{5}$$

where $v_d$ is an Abbe's number of each lens.

Satisfaction of Condition (5) facilitates favorable compensation for various aberrations generated in the first lens unit. A value smaller than the lower limit value of Condition (5) makes it difficult to compensate for chromatic aberration, while a value greater than the upper limit value of condition (5) renders lens materials costly; values out of the specified range are not preferable.

Furthermore, the upper limit value of Condition (5) may be modified to 83. In addition, the lower limit value is preferably modified to 81.5. Whereby, a telephoto lens can be easily constructed at low cost while suppressing chromatic aberration, which is easily generated in a telephoto lens.

Furthermore, every telephoto lens according to the present invention may satisfy Condition (3). In addition, the lower limit value of Condition (2) may be modified to −1.1, and the upper limit value may be modified to −0.6. Whereby, it is possible to achieve a better balance between compensation for curvature of field and insusceptibility to decentration.

Furthermore, every telephoto lens according to the present invention may satisfy Condition (3). In addition, the lower limit value of Condition (3) may be changed to −0.2, and Condition (3) may be modified to have an upper limit value, which is set to 0.5. Whereby, increase in cost of materials of the cemented lens can be prevented and accordingly good balance between price and performance of the telephoto lens can be easily kept.

Furthermore, the configuration may be made so that a photographing half-field angle is in the range from 10.0° to 0.5°. If the photographing half-field angle exceeds the upper limit, telephoto effect becomes weak, while, if the photographing half-field angle is smaller than the lower limit, it is difficult to assure certain brightness.

According to the present invention, the second lens unit may be configured to include, in order from the object side, a cemented lens composed of a positive lens and a negative lens, and a negative lens. Whereby, each of the above-described effects can be easily obtained with a small number of lenses.

Also, the fourth lens unit may be configured to include, in order from the object side, a cemented lens composed of a negative lens and a positive lens, and a negative lens. Whereby, each of the above-described effects can be easily obtained with a small number of lenses.

The embodiments of the present invention are described below in reference to the drawings.

First Embodiment

FIG. 1 is a sectional view that shows a lens configuration of the telephoto lens according to the first embodiment of the present invention, taken along the optical axis. FIG. 2 and FIG. 3 are diagrams that show spherical aberration, curvature of field. distortion, and chromatic aberration of magnification. Specifically, FIG. 2 show those under the infinity-focused condition, while FIG. 3 show those under the proximity-focused condition.

The telephoto lens according to the first embodiment includes, in order from the object side, a first lens unit G1 having a positive refracting power, a second lens unit G2 having a negative refracting power, a third lens unit G3 having a positive refracting power, and a fourth lens unit G4 having a negative refracting power.

The first lens unit G1 includes a first lens $L1_1$ having a negative refracting power, a second lens $L1_2$ having a positive refracting power, a third lens $L1_3$ having a positive refracting power, and a fourth lens $L1_4$ having a negative refracting power.

The second lens unit G2 includes a cemented lens composed of a fifth lens $L2_1$ having a positive refracting power and a sixth lens $L2_2$ having a negative refracting power, and a seventh lens $L2_3$ having a negative refracting power.

The third lens unit G3 includes a cemented lens composed of an eighth lens $L3_1$ having a negative refracting power and a ninth lens $L3_2$ having a positive refracting power.

The fourth lens unit G4 includes a cemented lens composed of a tenth lens $L4_1$ having a negative refracting power and an eleventh lens $L4_2$ having a positive refracting power, and a twelfth lens $L4_3$ having a negative refracting power. The twelfth lens $L4_3$ is formed as a meniscus lens.

Also, the telephoto lens according to the this embodiment is configured to move the second lens unit G2 and the fourth lens unit G4 toward the image side while the infinity-focused condition shown in FIG. 1 is shifted to the proximity-focused condition.

In FIG. 1, the reference symbol S represents a stop. The stop S is designed to move integrally with the fourth lens unit G4.

A telephoto lens apparatus according to the present invention has the telephoto lens according to the present invention and a lens mount section that is connectable with a camera on the image side of the telephoto lens. Whereby, the telephoto lens apparatus can be used for a lens-exchange type camera.

In addition, as is apparent from the embodiments of the present invention, all of the features set forth above can provide a much preferable telephoto lens or a telephoto lens apparatus even if variously combined together.

Here, numerical data of the optical members constituting the telephoto lens of the first embodiment are shown.

In the numerical data of the first embodiment, $r_1, r_2, \ldots$ are radii of curvature of lens surfaces shown in order from the object side, D0 is a distance from the object to the first surface, $d_1, d_2, \ldots$ are thicknesses of lenses or airspaces shown in order from the object side, $n_{d1}, n_{d2}, \ldots$ are refractive indices of lenses for d-line rays (587.56 nm) shown in order from the object side, $v_{d1}, v_{d2}, \ldots$ are Abbe's numbers of lenses ford-line rays (587.56 nm) shown in order from the object side, f is a focal length of the entire optical system, β is a photographing magnification, Fno. is an F number, and ω is a field angle.

These symbols are commonly used for the numerical data of the later-described embodiments also.

Numerical Data 1 f = 299.93 mm
Fno. = 2.85
ω = 2.1°
$r_1$ = 229.2379
$d_1$ = 5.0000    $n_{d1}$ = 1.68893    $v_{d1}$ = 31.07
$r_2$ = 148.0000
$d_2$ = 0.5000
$r_3$ = 140.4975
$d_3$ = 17.0000    $n_{d3}$ '2 1.49700    $v_{d3}$ = 81.61
$r_4$ = −395.6516
$d_4$ = 1.3623
$r_5$ = 158.1253
$d_5$ = 15.5797    $n_{d5}$ = 1.49700    $v_{d5}$ = 81.61
$r_6$ = 1387.1079
$d_6$ = 3.2209
$r_7$ = −526.0821
$d_7$ = 7.4367    $n_{d7}$ = 1.83400    $v_{d7}$ = 37.16
$r_8$ = −1.144 × 10$^4$
$d_8$ = D1
$r_9$ = −626.9255
$d_9$ = 10.0000    $n_{d9}$ = 1.84666    $v_{d9}$ = 23.78
$r_{10}$ = −124.2513
$d_{10}$ = 3.7428    $n_{d10}$ = 1.61340    $v_{d10}$ = 44.27
$r_{11}$ = −590.4502
$d_{11}$ = 6.0619
$r_{12}$ = −215.4860
$d_{12}$ = 4.1957    $n_{d12}$ = 1.69680    $v_{d12}$ = 55.53
$r_{13}$ = 103.4939
$d_{13}$ = D2
$r_{14}$ = 84.7418
$d_{14}$ = 4.5793    $r_{d14}$ = 1.68893    $v_{d14}$ = 31.07
$r_{15}$ = 56.0348
$d_{15}$ = 12.0000    $r_{d15}$ = 1.49700    $v_{d15}$ = 81.54
$r_{16}$ = −131.4268
$d_{16}$ = D3
$r_{17}$ = ∞ (stop)
$d_{17}$ = 5.2726
$r_{18}$ = −86.5660
$d_{18}$ = 5.0000    $n_{d18}$ = 1.56732    $v_{d18}$ = 42.82
$r_{19}$ = 80.5755
$d_{19}$ = 8.0000
$r_{20}$ = −156.6797
$d_{20}$ = 5.0000
$r_{21}$ = 61.8020
$d_{21}$ = 5.0000    $n_{d21}$ = 1.69680    $v_{d21}$ = 55.53
$r_{22}$ = 40.9660

(Variable distance in in-focus condition)

| | F, β | D0 | D1 | D2 | D3 |
|---|---|---|---|---|---|
| Infinity | 299.93 | ∞ | 63.4367 | 24.9984 | 10.611 |
| Proximity | −0.16 | 2045.7 | 88.3722 | 0.06286 | 15.9865 |

(Conditions)

Condition(1) = 81.61
Condition(2) = −0.976
Condition(3) = 0.239

Second Embodiment

Figure 4:
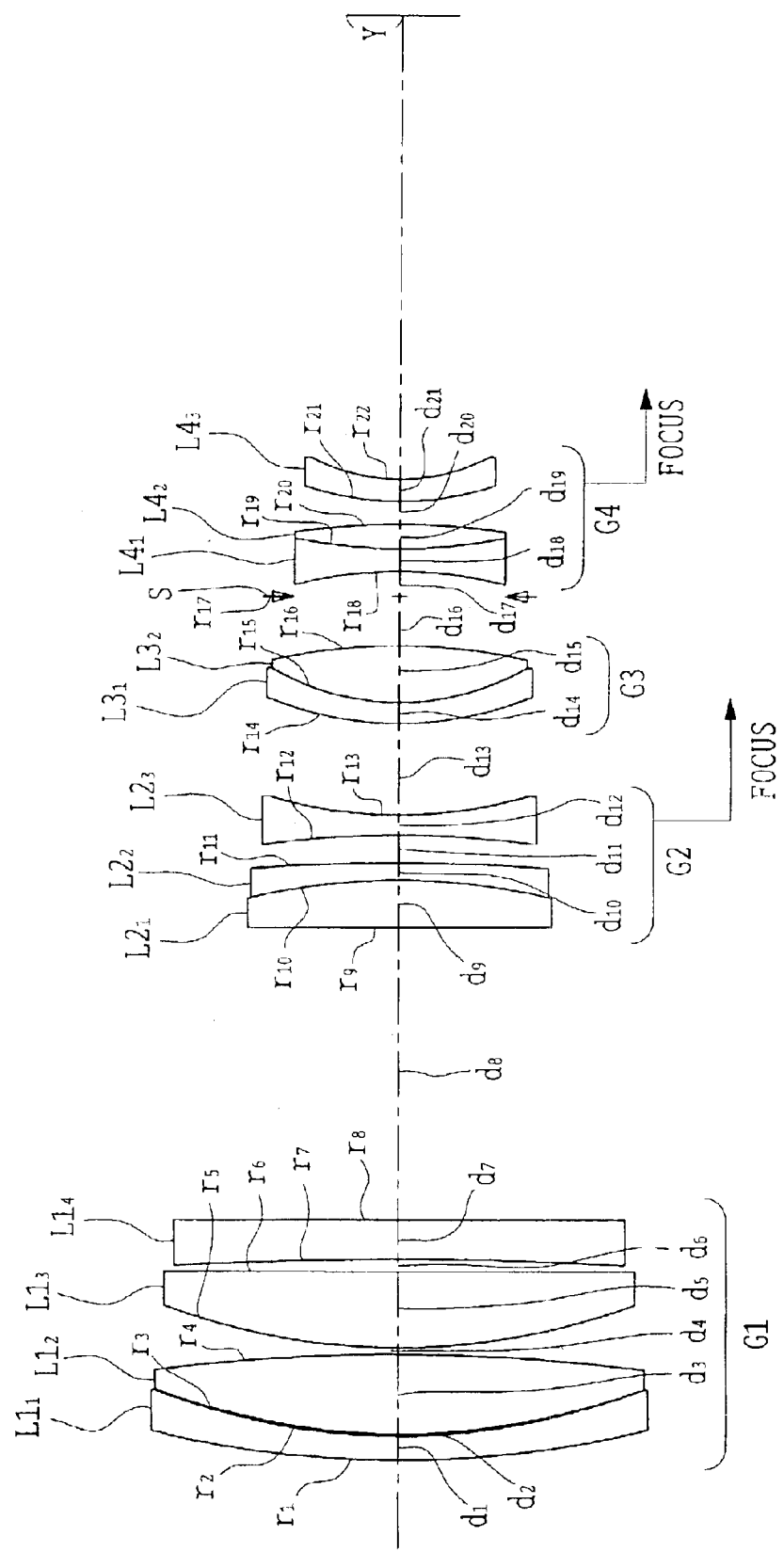
FIG. 4 is a sectional view that shows a lens configuration of the telephoto lens according to the second embodiment of the present invention, taken along the optical axis.

FIG. 4 is a sectional view that shows a lens configuration of the telephoto lens according to the second embodiment of the present invention, taken along the optical axis. FIG. 5 and FIG. 6 are diagrams that show spherical aberration, curvature of field, distortion, and chromatic aberration of magnification. Specifically, FIG. 5 show those under the infinity-focused condition, while FIG. 6 show those under the proximity-focused condition.

The telephoto lens according to the second embodiment includes, in order from the object side, a first lens unit G1 having a positive refracting power, a second lens unit G2 having a negative refracting power, a third lens unit G3 having a positive refracting power, and a fourth lens unit G4 having a negative refracting power.

The first lens unit G1 includes a first lens $L1_1$, having a negative refracting power, a second lens $L1_2$ having a positive refracting power, a third lens $L1_3$ having a positive refracting power, and a fourth lens $L1_4$ having a negative refracting power.

The second lens unit G2 includes a cemented lens composed of a fifth lens $L2_1$ having a positive refracting power and a sixth lens $L2_2$ having a negative refracting power, and a seventh lens $L2_3$ having a negative refracting power.

The third lens unit G3 includes a cemented lens composed of an eighth lens $L3_1$ having a negative refracting power and a ninth lens $L3_2$ having a positive refracting power.

The fourth lens unit G4 includes a cemented lens composed of a tenth lens $L4_1$ having a negative refracting power and an eleventh lens $L4_2$ having a positive refracting power, and a twelfth lens $L4_3$ having a negative refracting power. The twelfth lens $L4_3$ is formed as a meniscus lens.

Also, the telephoto lens according to the this embodiment is configured to move the second lens unit G2 and the fourth lens unit G4 toward the image side while the infinity-focused condition shown in FIG. 4 is shifted to the proximity-focused condition.

In FIG. 4, the reference symbol S represents a stop. The stop S is designed to move integrally with the fourth lens unit G4.

Here, numerical data of the optical members constituting the telephoto lens of the second embodiment are shown.

Numerical data 2 f = 300.008 mm
Fno. = 2.85
ω = 2.1°
$r_1$ = 239.9233
$d_1$ = 5.0000    $n_{d1}$ = 1.68893    $v_{d1}$ = 31.07
$r_2$ = 148.0000
$d_2$ = 0.5000
$r_3$ = 151.0206
$d_3$ = 17.0000    $n_{d3}$ = 1.49700    $v_{d3}$ = 81.61
$r_4$ = −393.6157
$d_4$ = 1.3720
$r_5$ = 146.3294
$d_5$ = 15.5935    $n_{d5}$ = 1.49700    $v_{d5}$ = 81.61
$r_6$ = 2465.3142
$d_6$ = 3.2396
$r_7$ = −713.5453
$d_7$ = 7.4334    $n_{d7}$ = 1.83400    $v_{d7}$ = 37.16
$r_8$ = 1542.0242
$d_8$ = D1
$r_9$ = −1031.4823
$d_9$ = 10.0000    $n_{d9}$ = 1.84666    $v_{d9}$ = 23.78
$r_{10}$ = −131.5347
$d_{10}$ = 3.7482    $n_{d10}$ = 1.61340    $v_{d10}$ = 44.27
$r_{11}$ = −400.7926
$d_{11}$ = 6.0783
$r_{12}$ = −183.5263
$d_{12}$ = 4.1985    $n_{d12}$ = 1.69680    $v_{d12}$ = 55.53
$r_{13}$ = 99.6614
$d_{13}$ = D2
$r_{14}$ = 76.1516
$d_{14}$ = 4.5846    $n_{d14}$ = 1.68893    $v_{d14}$ = 31.07
$r_{15}$ = 55.3835
$d_{15}$ = 12.0000    $n_{d15}$ = 1.49700    $v_{d15}$ = 81.54
$r_{16}$ = −118.0251
$d_{16}$ = D3
$r_{17}$ = ∞ (stop)
$d_{17}$ = 5.2721
$r_{18}$ = −86.2238
$d_{18}$ = 5.0000    $n_{d18}$ = 1.56732    $v_{d18}$ = 42.82
$r_{19}$ = 117.8769
$d_{19}$ = 5.0000    $n_{d19}$ = 1.80610    $v_{d19}$ = 40.92
$r_{20}$ = −169.0002

-continued

Numerical data 2

$d_{20} = 5.0000$
$r_{21} = 63.7540$
$d_{21} = 5.0000$   $n_{d21} = 1.69680$   $v_{d21} = 55.53$
$r_{22} = 40.9137$ (Variable distance in in-focus condition)

|  | F, β | D0 | D1 | D2 | D3 |
|---|---|---|---|---|---|
| Infinity | 300.008 | ∞ | 63.4474 | 19.326 | 10.6109 |
| Proximity | −0.105 | 3000.3984 | 78.366 | 4.4074 | 15.9866 |

(Conditions)

Condition (1) = 81.61
Condition (2) = −0.63
Condition (3) = 0.239

Third Embodiment

Figure 7:
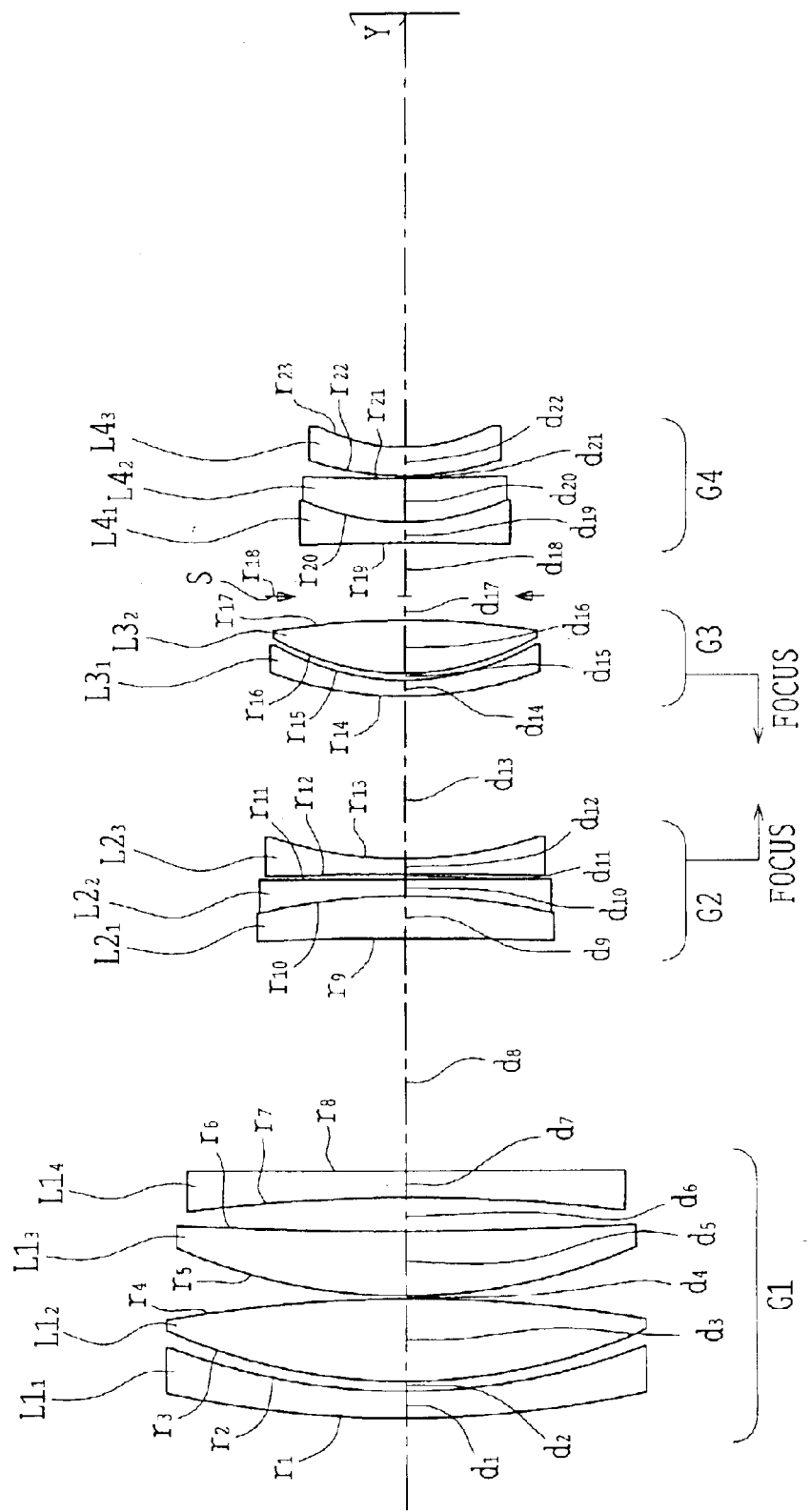
FIG. 7 is a sectional view that shows a lens configuration of the telephoto lens according to the third embodiment of the present invention, taken along the optical axis.

FIG. 7 is a sectional view that shows a lens configuration of the telephoto lens according to the third embodiment of the present invention, taken along the optical axis. FIG. 8 and FIG. 9 are diagrams that show spherical aberration, curvature of field, distortion, and chromatic aberration of magnification. Specifically, FIG. 8 show those under the infinity-focused condition, while FIG. 9 show those under the proximity-focused condition.

The telephoto lens according to the third embodiment includes, in order from the object side, a first lens unit G1 having a positive refracting power, a second lens unit G2 having a negative refracting power, a third lens unit G3 having a positive refracting power, and a fourth lens unit G4 having a negative refracting power.

The first lens unit G1 includes a first lens $L1_1$ having a negative refracting power, a second lens $L1_2$ having a positive refracting power, a third lens $L1_3$ having a positive refracting power, and a fourth lens $L1_4$ having a negative refracting power.

The second lens unit G2 includes a cemented lens composed of a fifth lens $L2_1$ having a positive refracting power and a sixth lens $L2_2$ having a negative refracting power, and a seventh lens $L2_3$ having a negative refracting power.

The third lens unit G3 includes an eighth lens $L3_1$ having a negative refracting power and a ninth lens $L3_2$ having a positive refracting power.

The fourth lens unit G4 includes a cemented lens composed of a tenth lens $L4_1$ having a negative refracting power and an eleventh lens $L4_2$ having a positive refracting power, and a twelfth lens $L4_3$ having a negative refracting power. The twelfth lens $L4_3$ is formed as a meniscus lens.

Also, the telephoto lens according to the this embodiment is configured to move the second lens unit G2 toward the image side and the third lens unit G3 toward the object side while the infinity-focused condition shown in FIG. 7 is shifted to the proximity-focused condition.

In FIG. 7, the reference symbol S represents a stop.

Here, numerical data of the optical members constituting the telephoto lens of the third embodiment are shown.

Numercal data 3

$f = 299.9986$ mm
Fno. = 2.80
ω = 2.33°
$r_1 = 248.8583$
$d_1 = 6.2258$   $n_{d1} = 1.74950$   $v_{d1} = 35.28$

-continued

Numercal data 3

$r_2 = 149.7739$
$d_2 = 2.1820$
$r_3 = 133.6304$
$d_3 = 18.5000$   $n_{d3} = 1.49700$   $v_{d3} = 81.54$
$r_4 = -317.0995$
$d_4 = 0.5859$
$r_5 = 130.9539$
$d_5 = 14.4960$   $n_d = 51.49700$   $v_{d5} = 81.54$
$r_6 = 938.4581$
$d_6 = 7.4719$
$r_7 = -399.8887$
$d_7 = 6.0000$   $nd_7 = 1.83400$   $v_{d7} = 37.16$
$r_8 = -5911.8564$
$d_8 = D1$
$r_9 = -1176.4309$
$d_9 = 9.5252$   $n_{d9} = 1.84666$   $v_{d9} = 23.78$
$r_{10} = -139.4432$
$d_{10} = 3.5880$   $r_{d10} = 1.63930$   $v_{d10} = 44.87$
$r_{11} = -8552.4362$
$d_{11} = 1.2541$
$r_{12} = -1073.3817$
$d_{12} = 3.4426$   $n_{d12} = 1.69680$   $v_{d12} = 55.53$
$r_{13} = 93.0994$
$d_{13} = D2$
$r_{14} = 86.4715$
$d_{14} = 3.5687$   $n_{d14} = 1.80100$   $v_{d14} = 34.97$
$r_{15} = 57.0560$
$d_{15} = 1.6186$
$r_{16} = 58.0496$
$d_{16} = 12.1657$   $n_{d16} = 1.49700$   $v_{d16} = 81.54$
$r_{17} = -190.3950$
$d_{17} = D3$
$r_{18} = ∞$ (stop)
$d_{18} = 12.0000$
$r_{19} = -719.5271$
$d_{19} = 4.5680$   $n_{d19} = 1.56732$   $v_{d19} = 42.82$
$r_{20} = 52.1479$
$d_{20} = 10.0933$   $r_{d20} = 1.80610$   $v_{d20} = 40.92$
$r_{21} = 529.2439$
$d_{21} = 0.5526$
$r_{22} = 68.1373$
$d_{22} = 6.3521$   $n_{d22} = 1.69680$   $v_{d22} = 55.53$
$r_{23} = 42.0858$ (Variable distance in in-focus condition)

|  | F, β | D0 | D1 | D2 | D3 |
|---|---|---|---|---|---|
| Infinity | 299.9986 | ∞ | 52.2724 | 36.8207 | 5.22 |
| Proximity | −0.1943 | 1685.0494 | 69.4098 | 3.1843 | 21.721 |

(Conditions)

Condition (1) = 81.54
Condition (2) = −1.06
Condition (3) = 0.239

The above-described telephoto lens according to the present invention is applicable to a silver-halide or digital, single-lens reflex camera. An application example is shown below.

Figure 10:
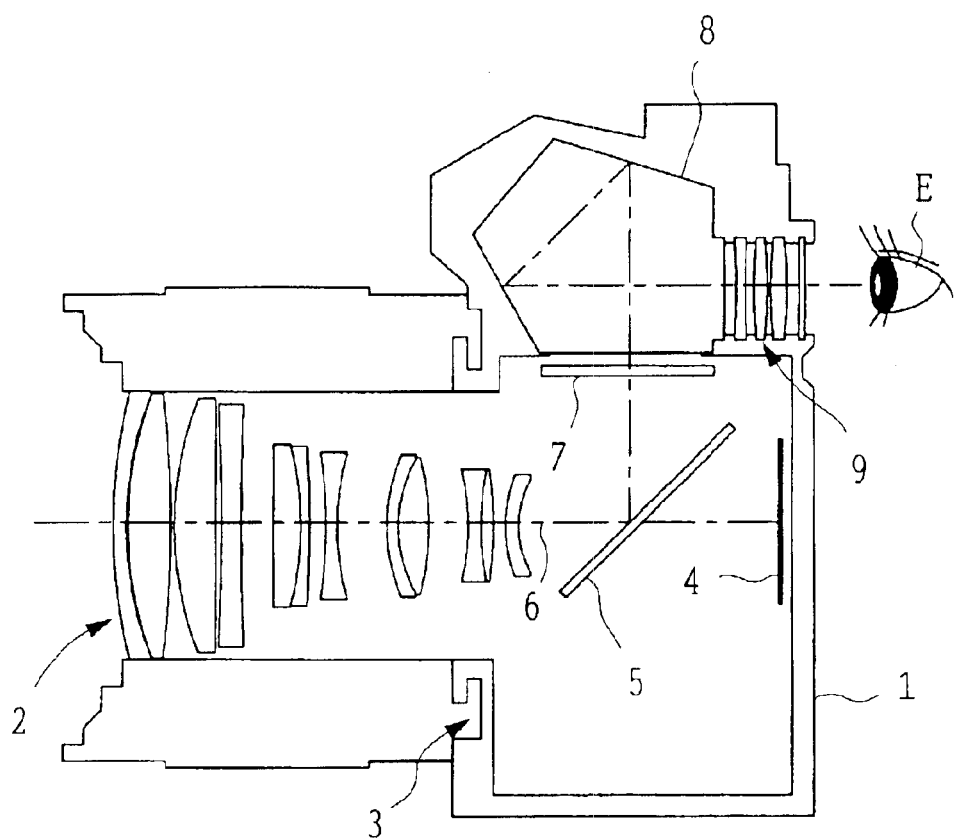
FIG. 10 is a diagram that shows a schematic configuration of a single-lens reflex camera which uses the telephoto lens according to the present invention as a photographing lens.

FIG. 10 shows a single-lens reflex camera which uses the telephoto lens according to the present invention as a photographing lens and a small-sized CCD as an image pickup element. A CMOS may be used in place of the CCD. In FIG. 10, the reference numeral 1 represents a single-lens reflex camera, the reference numeral 2 represents a photographing lens, the reference numeral 3 represents a mount section that achieves removable mount of the photographing lens 2 on the single-lens reflex camera 1 by using a screw type mount, a bayonet type mount or the like (In FIG. 10, a bayonet type mount is employed). Also, the reference numeral 4 represents a CCD picture surface (or CMOS picture surface), the reference numeral 5 represents a quick return mirror disposed between the lens system 2 and the CCD picture surface (or CMOS surface) 4 in the path 6 of rays of the photographing lens 2, the reference numeral 7 represents a finder screen disposed in the path of rays reflected from the quick return mirror, the reference numeral 8 represents a pentaprism, the reference numeral 9 represents a finder, and the reference symbol E represents an eye of an observer (eyepoint). The telephoto lens according to the present invention is used as a photographing lens 2 of the single-lens reflex camera 1 of this configuration.

What is claimed is:

1. A telephoto lens comprising, in order from an object side:
   a first lens unit having a positive refracting power;
   a second lens unit having a negative refracting power;
   a third lens unit having a positive refracting power; and
   a fourth lens unit having a negative refracting power,
   wherein the second lens unit comprises a cemented lens composed of a positive lens and a negative lens, and a negative lens,
   wherein the fourth lens unit comprises a cemented lens composed of a negative lens and a positive lens, and a negative lens, and
   wherein the telephoto lens satisfies the following conditions $$v_d > 8$$
   $$0.5 > f_4/f > -1.2$$

where $v_d$ is an Abbe's number of a lens having a positive refracting power in the first lens unit, $f_4$ is a focal length of the fourth lens unit, and $f$ is a focal length of an entire optical system.

2. A telephoto lens according to claim 1, wherein the following condition is satisfied:

$$n_{d1} - n_{d2} > 0.2$$

wherein $n_{d1}$ is a refractive index of the positive lens and $n_{d2}$ is a refractive index of the negative lens, in the cemented lens in the fourth lens unit.

3. A telephoto lens comprising, in order from an object side:
   a first lens unit having a positive refracting power;
   a second lens unit having a negative refracting power;
   a third lens unit having a positive refracting power; and
   a fourth lens unit having a negative refracting power,
   wherein the first lens unit consists of two positive lenses and two negative lenses.

4. A telephoto lens according to claim 3, wherein the first lens unit consists of, in order from the object side, a negative lens, two positive lenses, and a negative lens.

5. A telephoto lens according to any one of claims 1 through 4, wherein a configuration is made so that, in focusing toward a proximity, the second lens unit and the fourth lens unit are moved toward an image side.

6. A telephoto lens according to any one of claims 1 through 4, wherein the fourth lens unit comprises a cemented lens composed of a positive lens and a negative lens, and a negative meniscus lens.

7. A telephoto lens according to any one of claims 1 through 4, wherein the following condition is satisfied:

$$10.0 \text{ mm} > y > 13.0 \text{ mm}$$

where Y is a diagonal length of a picture surface.

8. A telephoto lens according to claim 1 or 2, wherein the first lens unit comprises a plurality of lenses each having a positive refracting power, of which lenses a plurality of lenses satisfy the following condition:

$$v_d > 80$$

where $v_d$ is an Abbe's number of a lens having a positive refracting power in the first lens unit.

9. A telephoto lens according to any one of claims 1 through 4, wherein each lens having a positive refracting power included in the first unit satisfies the following condition:

$$85 > v_d > 80$$

where $v_d$ is an Abbe's number of a lens having a positive refracting power in the first lens unit.

10. A telephoto lens according to any one of claims 1 through 4, wherein the following condition is satisfied:

$$-0.6 > f_4/f > -1.1$$

where $f_4$ is a focal length of the fourth lens unit, and f is a focal length of an entire optical system.

11. A telephoto lens according to claim 3 or 4, wherein the fourth lens unit comprises a cemented lens composed of a negative lens and a positive lens, and the following condition is satisfied:

$$n_{d1} - n_{d2} > 0.2$$

where $n_{d1}$ is a refractive index of the positive lens and $n_{d2}$ is a refractive index of the negative lens, in the cemented lens in the fourth lens unit.

12. A telephoto lens according to any one of claims 2 through 4, wherein the following condition is satisfied:

$$0.5 > n_{d1} - n_{d2} 0.2$$

where $n_{d1}$ is a refractive index of the positive lens and $n_{d2}$ is a refractive index of the negative lens, in the cemented lens in the fourth lens unit.

13. A telephoto lens according to any one of claims 1 through 4, wherein a configuration is made so that, in focusing toward a proximity, at least the first lens unit is fixed and the second lens unit is moved toward an image side.

14. A telephoto lens according to any one of claims 1 through 4, wherein a configuration is made so that, in focusing toward a proximity, the second lens unit is moved toward an image side and the third lens unit is moved toward the object side.

15. A telephoto lens according to claim 5, wherein a configuration is made so that, in focusing toward the proximity, the first lens unit and the third lens unit are fixed.

16. A telephoto lens according to claim 14, wherein a configuration is made so that, in focusing toward the proximity, the first lens unit and the fourth lens unit are fixed.

17. A telephoto lens according to any one of claims 1 through 4, wherein a photographing half-field angle is in a range from 10.0° to 0.50.

18. A telephoto lens according to any one of claims 1 through 4, wherein the second lens unit consists of, in order from the object side, a cemented lens composed of a positive lens and a negative lens, and a negative lens.

19. A telephoto lens according to any one of claims 1 through 4, wherein the fourth lens unit consists of, in order from the object side, a cemented lens composed of a negative lens and a positive lens, and a negative lens.

20. A telephoto lens apparatus comprising a telephoto lens, the telephoto lens comprising, in order from an object side:

a first lens unit having a positive refracting power;
a second lens unit having a negative refracting power;
a third lens unit having a positive refracting power; and
a fourth lens unit having a negative refracting power,
wherein the telephoto lens has a lens mount section that is connectable with a camera on an image side,
wherein the second lens unit comprises a cemented lens composed of a positive lens and a negative lens, and a negative lens,
wherein the fourth lens unit comprises a cemented lens composed of a negative lens and a positive lens, and a negative lens, and
wherein the telephoto lens satisfies the following conditions $\nu_d > 80$ $-0.5 > f_4/f > -1.2$ where $\nu_d$ is an Abbe's number of a lens having a positive refracting power in the first lens unit, $f_4$ is a focal length of the fourth lens unit, and f is a focal length of an entire optical system.

21. A telephoto lens comprising, in order from an object side:
a first lens unit having a positive refracting power;
a second lens unit having a negative refracting power;
a third lens unit having a positive refracting power; and
a fourth lens unit having a negative refracting power,
wherein the first lens unit consists of at least two positive lenses and two negative lenses, and
wherein none of the lenses in the first lens unit are cemented.

* * * * *

UNITED STATES PATENT AND TRADEMARK OFFICE
CERTIFICATE OF CORRECTION

PATENT NO. : 6,927,926 B2
APPLICATION NO. : 10/413218
DATED : August 9, 2005
INVENTOR(S) : Takashi Kasahara and Masahiro Imamura It is certified that error appears in the above-identified patent and that said Letters Patent is hereby corrected as shown below:

Column 7, line 13 replace " '2 1.49700" with -- 1.49700 --

Column 10, line 10 replace "51.49700" with -- 1.49700 --

Column 10, line 14 replace "$nd_7$ with -- $n_{d7}$ --

Column 12, line 57 replace 0.050 with $0.5^0$ --

Signed and Sealed this

Eighteenth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,927,926 B2  
APPLICATION NO. : 10/413218  
DATED : August 9, 2005  
INVENTOR(S) : Kasahara et al.

Page 1 of 1

It is certified that error appears in the above-identified patent and that said Letters Patent is hereby corrected as shown below:

| Column | Line | |
|---|---|---|
| 11 | 26 | Change "$v_d>8$" to -- $v_d 80$ --; |
| 11 | 27 | Change "$0.5>f_4/f>-1.2$" to -- $-0.5>f_4/f>-1.2$ --; |
| 11 | 63 | Change "$10.0mm>y>13.0mm$" to -- $10.0mm<y<13.0mm$ --; and |
| 12 | 33 | Change "$0.5>n_{d1}-n_{d2}0.2$" to -- $0.5>n_{d1}-n_{d2}>0.2$ --. |

Signed and Sealed this

Twenty-eighth Day of November, 2006

JON W. DUDAS  
*Director of the United States Patent and Trademark Office*